(12) United States Patent
Niklewicz et al.

(10) Patent No.: US 10,060,459 B2
(45) Date of Patent: Aug. 28, 2018

(54) REMOVABLE BLIND FASTENER FOR NARROW APERTURES

(71) Applicant: Kwikbolt Limited, Kingston Upon Thames (GB)

(72) Inventors: Jan Niklewicz, Kingston Upon Thames (GB); Dean Carran, Kingston Upon Thames (GB)

(73) Assignee: Kwikbolt Limited, Kingston Upon Thames (GB)

( * ) Notice: Subject to any disclaimer, the term of this patent is extended or adjusted under 35 U.S.C. 154(b) by 330 days.

(21) Appl. No.: 14/898,123

(22) PCT Filed: Jun. 18, 2014

(86) PCT No.: PCT/IB2014/062382
§ 371 (c)(1),
(2) Date: Dec. 12, 2015

(87) PCT Pub. No.: WO2014/203187
PCT Pub. Date: Dec. 24, 2014

(65) Prior Publication Data
US 2016/0138628 A1 May 19, 2016

(30) Foreign Application Priority Data
Jun. 19, 2013 (GB) .................................. 1310926.9

(51) Int. Cl.
*F16B 21/00* (2006.01)
*F16B 5/02* (2006.01)
(Continued)

(52) U.S. Cl.
CPC .......... *F16B 5/0258* (2013.01); *F16B 13/063* (2013.01); *F16B 19/109* (2013.01); *F16B 19/1072* (2013.01); *F16B 21/00* (2013.01)

(58) Field of Classification Search
CPC ...... F16B 5/0258; F16B 13/04; F16B 13/063; F16B 13/08; F16B 13/0825; F16B 19/10;
(Continued)

(56) References Cited

U.S. PATENT DOCUMENTS 2,805,597 A * 9/1957 O'Shaughnessy, Jr.
.............................. F16B 5/0233
411/80.2
4,015,505 A 4/1977 Murray
(Continued)

FOREIGN PATENT DOCUMENTS

| AU | 5108079 A | 3/1981 |
|---|---|---|
| GB | 989834 A | 4/1965 |
| GB | 1270522 A | 4/1972 |

OTHER PUBLICATIONS

International Search Report for PCT/IB2014/062382, Sep. dated 29, 2014.

*Primary Examiner* — Roberta S Delisle
(74) *Attorney, Agent, or Firm* — Schott P.C.

(57) ABSTRACT

The present invention provides a removable blind fastener (2) having a first tubular element (4) comprising an arm portion (22), a second tubular element (6) comprising an arm portion (28), and an elongate screw member (8). The elements (4 and 6) are arranged in telescoping relationship one with the other and which fastener (2), when in use as a temporary fastener, is caused to secure the component parts (10 and 12) of an airframe by causing telescoping movement of the elements (4 and 6) towards each other when the screw member (8) is turned in one direction and is caused to release the component parts (10 and 12) of the airframe by causing telescoping movement of the elements (4 and 6) away from each other when the screw member (8) is turned in an opposite direction. The arm portions (22, 28) of the elements (4 and 6) are located in mutual juxtaposition for (Continued)

telescoping movement upon rotation of the screw member (8) as aforesaid with end portions (30a and 32a) of elongate arms (30 and 32) of the arm portions (22 and 28) being brought into engagement with a tapered portion (44) of the screw member (8) whereby the arms (30 and 32) are caused to splay outwardly to bring the end portions (30a and 32a) into engagement with an underside (126) of the component (12) and moving the component (12) into secure temporary relationship with the component (10) of the airframe.

16 Claims, 11 Drawing Sheets

(51) Int. Cl.
  *F16B 19/10* (2006.01)
  *F16B 13/06* (2006.01)

(58) Field of Classification Search
  CPC .............. F16B 19/1027; F16B 19/1063; F16B 19/1072; F16B 21/00
  USPC ... 411/32, 55, 60.1, 63, 80.6, 340, 346, 363, 411/367, 383, 385, 432
  See application file for complete search history.

(56) References Cited

U.S. PATENT DOCUMENTS

| | | | | |
|---|---|---|---|---|
| 4,388,031 A | * | 6/1983 | Rodgers | F16B 19/086 411/344 |
| 6,129,762 A | * | 10/2000 | Li | A61B 17/0401 411/55 |
| 2006/0193712 A1 | * | 8/2006 | Kuna | E03C 1/0401 411/340 |
| 2008/0131231 A1 | * | 6/2008 | Kuna | E03C 1/0401 411/433 |
| 2010/0327505 A1 | | 12/2010 | Pratt | |

* cited by examiner

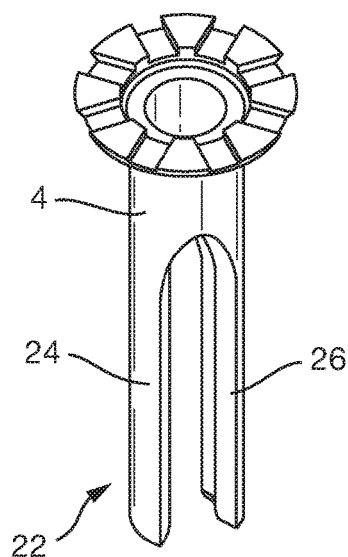
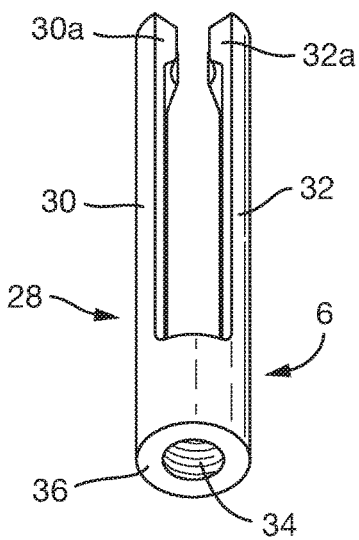
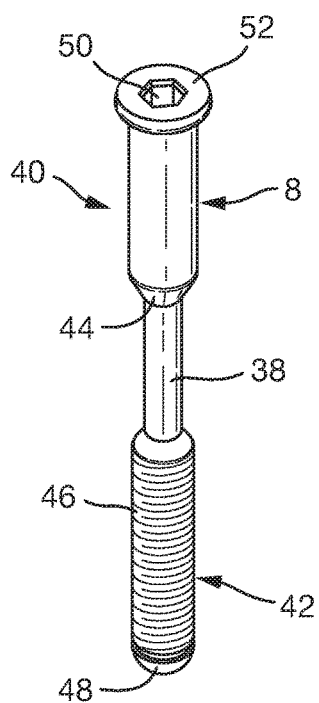

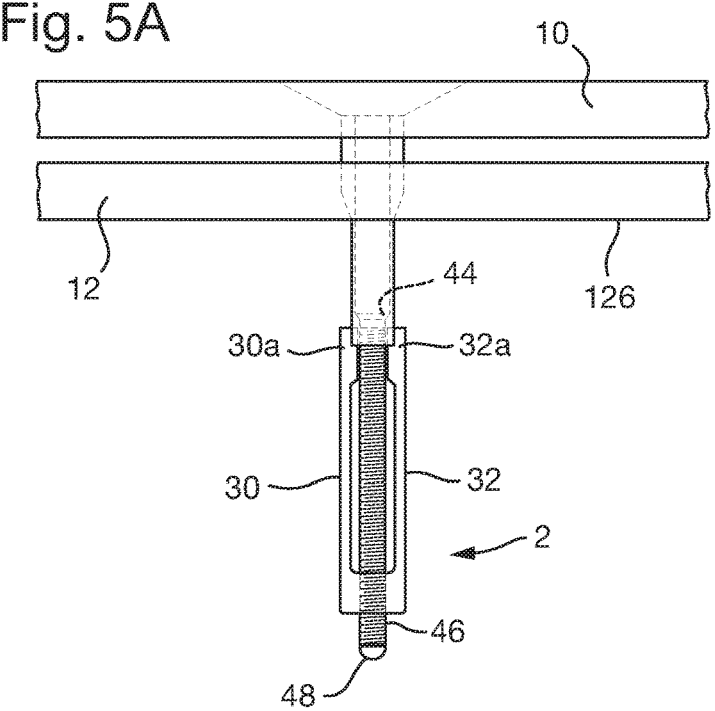
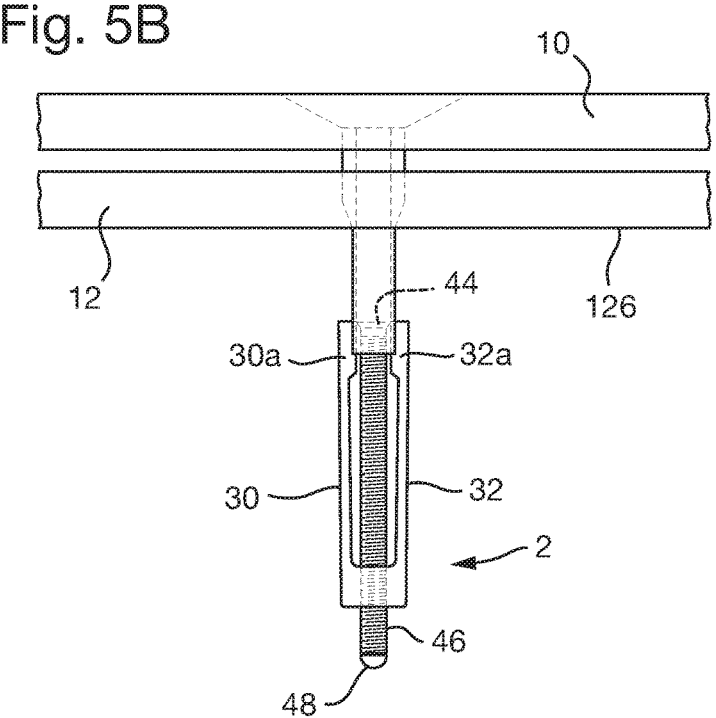

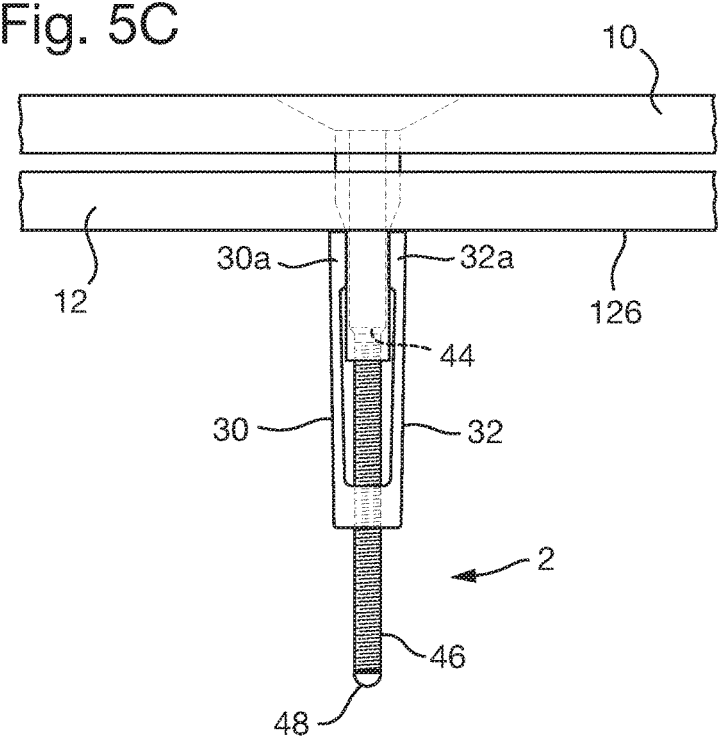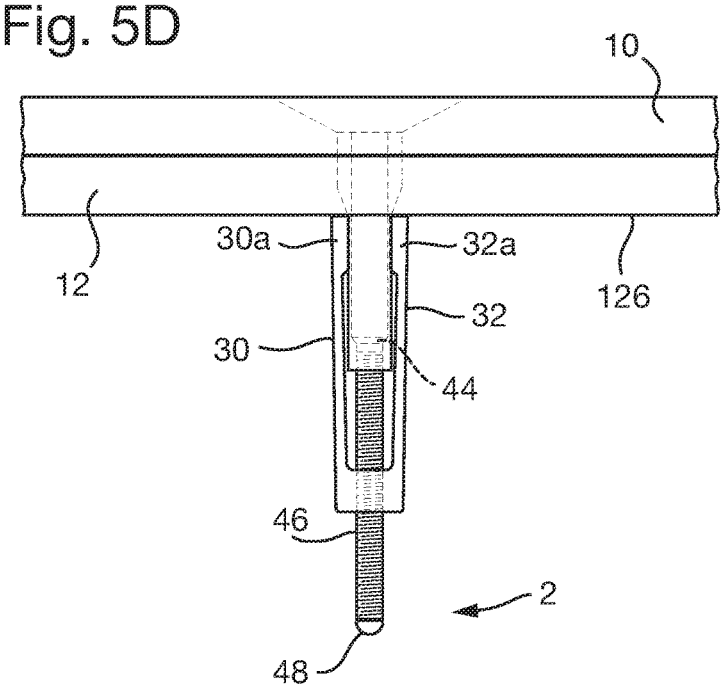

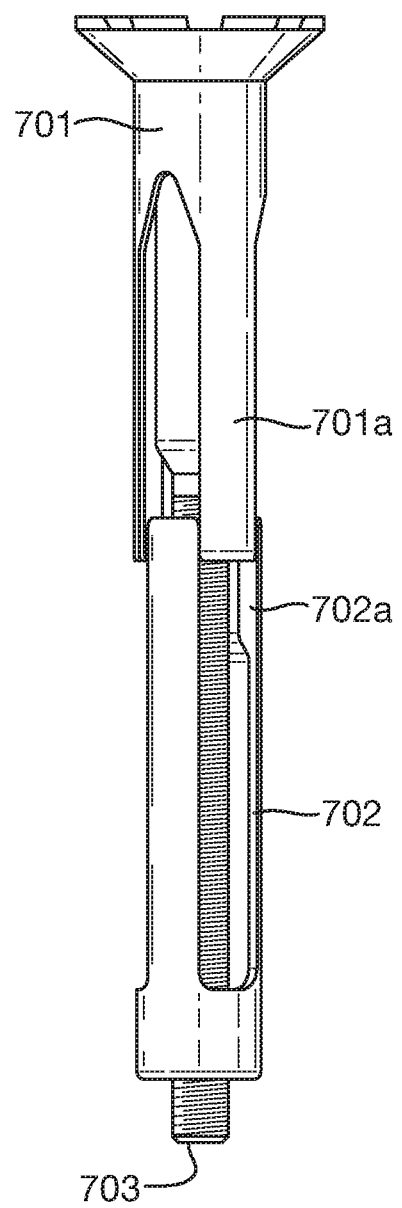

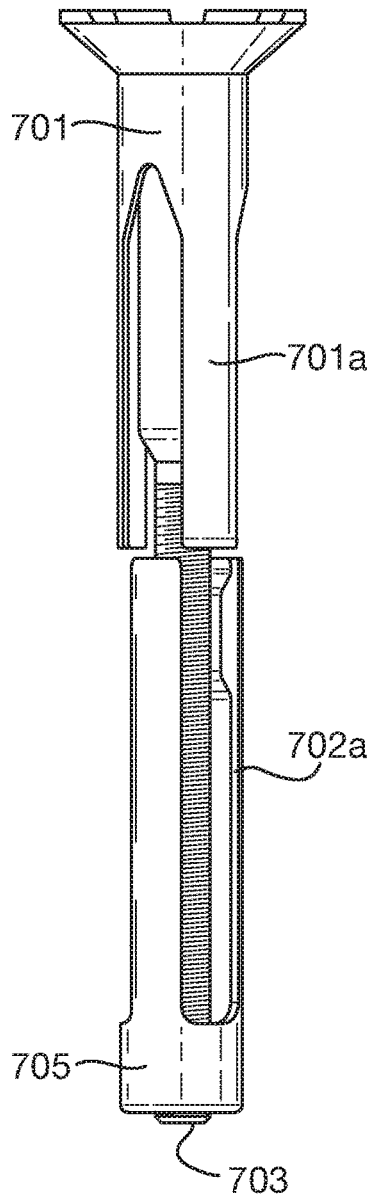
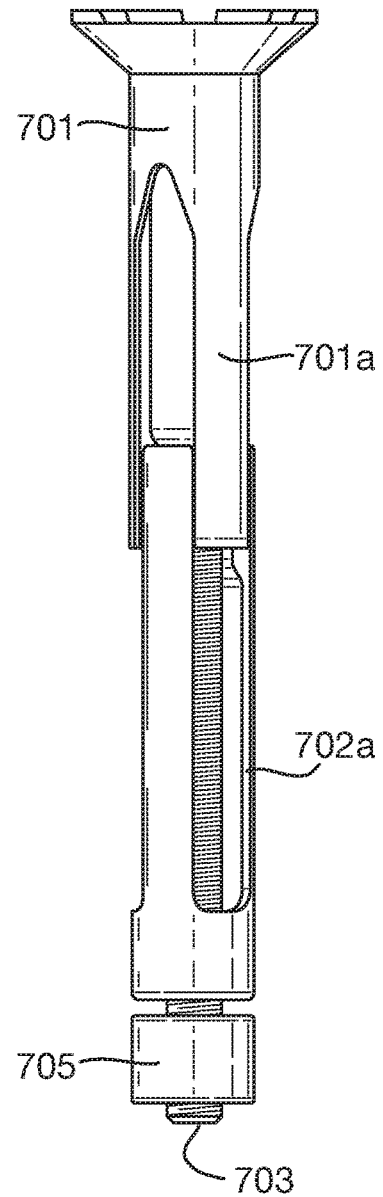

REMOVABLE BLIND FASTENER FOR NARROW APERTURES

The present invention is concerned with improvements in or relating to removable blind fasteners and is particularly concerned with removable blind fasteners for use in temporarily co-joining wing elements of an aircraft frame.

In the manufacture of aircraft frames, especially the wing elements, removable blind fasteners are used as a temporary fixing for the wing elements by inserting the fasteners in apertures provided in the wing elements. This is performed to determine the compatibility of the co-joined elements during an inspection process with adjustment of the apertures and alignment of the wing elements as necessary. After inspection and adjustment as required the removable blind fasteners are removed and permanent blind fasteners installed in the apertures. Several prior proposals for removable blind fasteners have been documented; however, the performance of such proposals has left a lot to be desired; in addition the complexity of the prior proposals often mitigates against achieving the best results at an acceptable cost. Therefore, the present invention seeks to overcome, or at least mitigate the disadvantages of the prior proposals. Thus the present invention conveniently provides a removable blind fastener comprising:

a) a first tubular element of elongate form with a head portion at one end and an arm portion having a plurality of arms extending away from the head end of the first tubular element in a direction parallel to the central axis of the first tubular element, the space between said arms forming guide channels;

b) a second tubular element of elongate form comprising an internally threaded portion and an arm portion having a plurality of outwardly biasable resilient arms extending away from the threaded portion in a direction parallel to the central axis of the second tubular element, each of said arms having an end portion at a free end thereof, said arms of the second tubular element arranged to move within the guide channels of the first tubular element; and, c) an elongate screw member comprising a screw head located, in use, within the head portion of the first element and wherein the second element is prevented from being removed from the head end of the first element by the head portion of the first element whereby:

(i) rotation of the screw member in a first direction causes telescoping movement of the second tubular element away from the head portion of the first member in a releasing direction; and, (ii) rotation of the screw member in a second direction causes telescoping movement of the second tubular element towards the head portion of the first tubular member in a clamping direction, such that when the removable blind fastener is in use the arms of the second tubular element are located in mutual juxtaposition with the guide channels of the first tubular element, such that space between the arms of the first tubular element is occupiable by the arms of the second tubular element and space between the arms of the second tubular element is occupiable by the arms of the first tubular element, wherein the screw member comprises a first portion near the head end of the screw member and a second portion further from the head end of the screw member than the first portion, wherein the diameter of the first portion is greater than the diameter of the second portion, such that the transition between the first portion and the second portion provides an arm actuating feature, and when in use and the elongate screw member is rotated in the second direction as aforesaid, the end portions of the arm portion of the second tubular element are moved towards the head portion of the first tubular element within the guide channels of the first tubular element as aforesaid, and the end portions of the arm portion are brought into engagement with the arm actuating feature of the screw member to bias the end portions of the second tubular element outward, away from the central axis of the second tubular element, and wherein, in use, the fastener comprising a unit of the first tubular element, second tubular element and screw member is insertable and removable through an aperture in each of two work-pieces to be joined together.

The screw member may comprise a third portion further from the head end of the screw member than the second portion, said third portion having a diameter greater than that of the second portion, such that the second portion of the screw member defines a narrow waist to the screw member and wherein the third portion is threaded for engaging with the internally threaded portion of the second tubular element.

The elongate screw member may comprise a tapered portion between the first portion and the second portion thereof, the tapered portion providing the transition between the first and second portions.

The end portions of the arm portions of the second tubular element may have a thickness in a direction perpendicular to the central axis of the second tubular element, wherein the thickness of the end determines the distance that the end portions are biased away from the central axis of the second tubular element.

The ends of the second tubular element may have a clamping face arranged at an angle such that, when the arms are biased outward the clamping face is substantially perpendicular to the central axis of the second tubular element.

The arms of the second tubular element may have an arcuate cross section.

The number of arms of the second tubular element may be equal to the number of guide channels of the first tubular element.

The first and second tubular elements may have two or three or four arms.

A further embodiment of the a removable blind fastener comprises:

a) a first tubular element of elongate form with a head portion at one end thereof;

b) a second tubular element of elongate form located in telescoping relationship with respect to the first elongate element; and, c) an elongate screw member comprising a screw head located, in use, within the head portion of the first element and wherein the second element is prevented from being removed from the head end of the first element by the head portion of the first element whereby:

(i) rotation of the screw member in a first direction causes telescoping movement of the second tubular element away from the head portion of the first member; and, (ii) rotation of the screw member in a second direction causes telescoping movement of the second tubular element towards the head portion of the first tubular member, characterised in that the first tubular element comprises an arm portion where at least two arms extend from the head portion thereof and the second tubular element comprises an arm portion having at least two arms extending from the internally threaded tubular portion wherein, when the removable blind fastener is in use the arm portions of the first and second tubular elements are located in mutual juxtaposition such that space between the arms of the first tubular element is occupiable by the arms of the second tubular element and space between the arms of the second tubular element is occupiable by the arms of the first tubular element, and wherein, in use, the fastener comprising a unit of the first tubular element, second tubular element and screw member is insertable and removable through an aperture in each of two work-pieces to be joined together.

Preferably, the second tubular element comprises an internally threaded tubular portion at an end thereof for receiving in threaded engagement, when the removable blind fastener is in use, an externally threaded portion formed at a distal end of the screw member remote from the head portion thereof, wherein the arms of the arm portion extend away from the internally threaded tubular portion of the second tubular element.

More preferably, the screw member comprises a mid portion of reduced diameter provided between upper and lower portions of the elongate screw member and the elongate screw member also comprises a tapered portion between the upper portion and the mid portion thereof.

Conveniently, when in use and the elongate screw member is rotated in the second direction as aforesaid, end portions of the arm portion of the second tubular element are moved towards the head portion of the first tubular member as aforesaid, the end portions of the arm portion of the second tubular element being brought into engagement with the tapered portion of the screw member to cause the end portions to splay outwardly beyond the maximum diameter of the removable blind fastener.

Preferably, when assembled for use, the fastener has a constant external diameter along its length except for the head portion of the first tubular element, the head portion of which comprises an outwardly flared portion and an end face of the outwardly flared portion comprises a plurality of equally spaced radial slots.

In a further preferred embodiment provided by the present invention the screw head of the elongate screw member comprises a blind aperture to facilitate by use of a tool, when the fastener is in use, rotation of the screw in either a first or a second direction. Preferably, when the fastener is in use for temporarily co-joining elements of a component, engagement of the tool element with the spaced radial slots of the first tubular element prevents rotation of the fastener when the elongate screw member is rotated in either its first or second directions.

Conveniently, the first and second tubular elements and the elongate screw member are made from steel or the first and second tubular elements and the elongated screw member are made from carbon fibre reinforced plastic compositions.

The present invention conveniently provides a method of temporarily co-joining first and second components using a removable blind fastener according to any one of the preceding Claims, characterised in that the components are provided with apertures with diameters slightly larger than the diameter of the removable blind fastener, the method comprising the steps of:

d) aligning the apertures of the first and second components one with the other;
e) inserting a removable blind fastener through the aligned apertures with a tapered part of the head portion of the first tubular element located in a countersunk portion of the first component;
f) engaging the head of the elongate screw element with a tool comprising means for location in radial slots and a blind aperture of the elongate screw element;
g) operating the tool to rotate the elongate screw element in a clockwise direction to cause telescoping movement between the first and second tubular elements thereby bringing end portions of the second tubular element into engagement with a tapered portion of the elongate screw element to cause end portions to splay outwardly beyond the maximum diameter of the removable blind fastener; and,
h) operating the tool until the splayed out end portions of the bifurcated second tubular element engage with an underside of the second component to temporarily co-join the first and second components.

The present invention also conveniently provides a method of removing a removable blind fastener from co-joined components, as achieved by the method of the last preceding paragraph, whereby the tool is used to cause rotation of the elongate screw element in a first direction to effect telescoping movement of the second tubular element away from the head portion of the first tubular element and movement of the end portions of the second tubular element into alignment with the arm portion of the first tubular element in order to facilitate the withdrawal of the removable blind fastener from the co-joined components.

There now follows a detailed description of the present invention that is to be read with reference to the accompanying drawings in which:

FIG. 2 is a an upper perspective view of a first tubular element of the fastener illustrated in FIG. 1;

FIG. 3 is an upper perspective view of a second tubular element of the fastener illustrated in FIG. 1;

FIG. 4 is an upper perspective view of an elongate screw member of the fastener illustrated in FIG. 1;

FIG. 5A is a side view illustrating an embodiment of the fastener when inserted in a common aperture between components to be co-joined, the fastener being shown in the first phase of operation, whereby the arms of the second tubular member are flush with the outer surface of the first tubular member;

FIG. 5B is a side view illustrating an embodiment of the fastener when inserted in a common aperture between components to be co-joined, the fastener being shown in the second phase of operation, whereby the arms of the second tubular member are starting to be splayed outward against a feature of the screw member.

FIG. 5C is a side view illustrating an embodiment of the fastener when inserted in a common aperture between components to be co-joined, the fastener being shown in the third phase of operation but before clamping has taken place, whereby the arms of the second tubular member are fully splayed outward against a feature of the screw member.

FIG. 5D is a side view illustrating an embodiment of the fastener when inserted in a common aperture between components to be co-joined, the fastener being shown in the third phase of operation after clamping of the components has taken place, whereby the arms of the second tubular member are splayed outward and drawn toward the head end of the fastener to clamp the components together;

FIG. 7A is a side view of a further embodiment of an assembled fastener having three arms on the first and second tubular members;

FIG. 7C is a side view of the fastener of FIG. 7A in a position where the first and second tubular members are disengaged from one another.

FIG. 7D is a side view of to further embodiment of a fastener having three arms on the first and second tubular members and also a stop nut on the end of the screw member.

Figure 1:
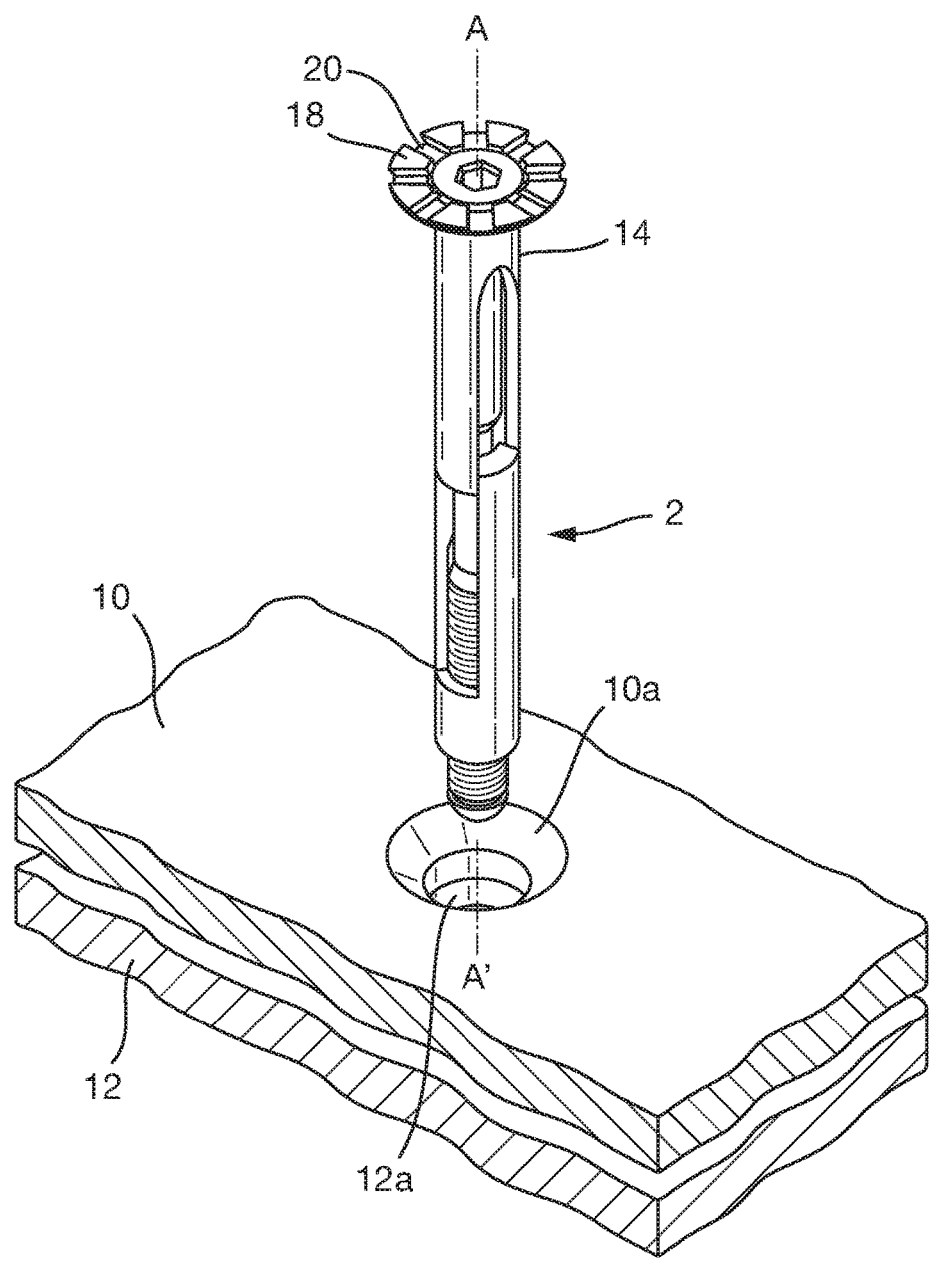
FIG. 1 is an upper perspective view of a removable blind fastener provided by the present invention, the fastener being illustrated in an operative condition.

Generally, the present invention provides a removable blind fastener 2 (with reference to FIG. 1) comprising a first tubular element 4 (with reference to FIG. 2), a second tubular element 6 (with reference to FIG. 3) and an elongate screw member 8 (with reference to FIG. 4). The fastener 2 is intended for use in temporarily co-joining airframe components 10 and 12, see FIGS. 1, 5 and 6

The first tubular element 4 comprises a head portion 14 at an upper end portion thereof, which head portion 14 is formed with an outwardly flared portion 18 being provided with eight equally spaced radial slots 20 for a purpose to be described hereinafter, see FIGS. 1 and 2.

The first tubular element 4 also comprises an arm portion 22, comprised of two oppositely disposed, elongate arms 24 and 26, as shown in FIG. 2, the purpose for which will become clear hereinafter. The arms 24 and 26 form a bifurcated portion. The first tubular element 4 may have more than two arms, particularly if the complete fastener 2 is required to be of large diameter. A fastener with three arms is shown in FIG. 7A. The arms 24, 26 of the second tubular element are fixed at one end (preferably by being integrally formed as part of the first tubular element 4) and free at the other end, and a space is defined between each arm. The space between each arm defines a guide channel and the arms 24, 26 may have a thickened end, the side of which forms a guiding surface. The outer surface of each arm is shaped as a portion of the outer surface of a cylinder.

The second tubular element 6 comprises an arm portion 28, comprised of two oppositely disposed, elongate arms 30 and 32, as shown in FIG. 3, the purpose for which will become clear hereinafter. With two arms, the arm portion is bifurcated. However, the second tubular element 4 may also have more than two arms to allow larger diameter fastener to be produced.

The number of arms on the first tubular element is equal to the number of arms on the second tubular element, or more particularly, the number of spaces between the arms of the second tubular element should be equal to the number of arms on the first tubular element, and vice versa.

The second tubular element 6 also comprises an internally threaded tubular portion 34 at an end 36 thereof, see FIG. 3, the purpose for which threaded tubular portion 34 will become clear hereinafter. The arms 30, 32 of the second tubular element are fixed at one end (preferably by being integrally formed as part of the second tubular element 6) and free at the other end, and a space is defined between each arm. The outer surface of each arm is shaped as a portion of a cylinder. The arms are resiliently biasable outwards, i.e. the arms are sprung so that when the arms are deformed outward they can spring back to their original position. This allows the fastener to be removable and re-usable. In other words, the arms of the second tubular element can flex. The arms 30, 32 have ends 30a, 32a provided with a number of functional faces.

The arm ends 30a, 32a each have a flat face at the free end for engaging with the work-piece to be clamped, described in more detail below. For larger apertures more arms can be provided to spread the clamping load on the surface of the work-piece to be clamped.

The elongate screw member 8 comprises a mid portion 38 of reduced diameter provided between upper and lower portions 40 and 42 respectively. In an embodiment and as shown in FIG. 4, the screw member 8 has a tapered portion 44 being provided as a transition between the upper portion 40 and the mid portion 38.

The elongate screw member 8 further comprises an externally threaded portion 46 at a lower end portion 48 and a blind, hexagonal shaped aperture 50 in a head 52 of the screw member 8 for receiving a tool, not shown, for a purpose to be made clear hereinafter. The upper portion 40 of the screw member is smooth and acts as a bearing surface for the arms 30, 32 of the second tubular element 6.

Figure 6A:
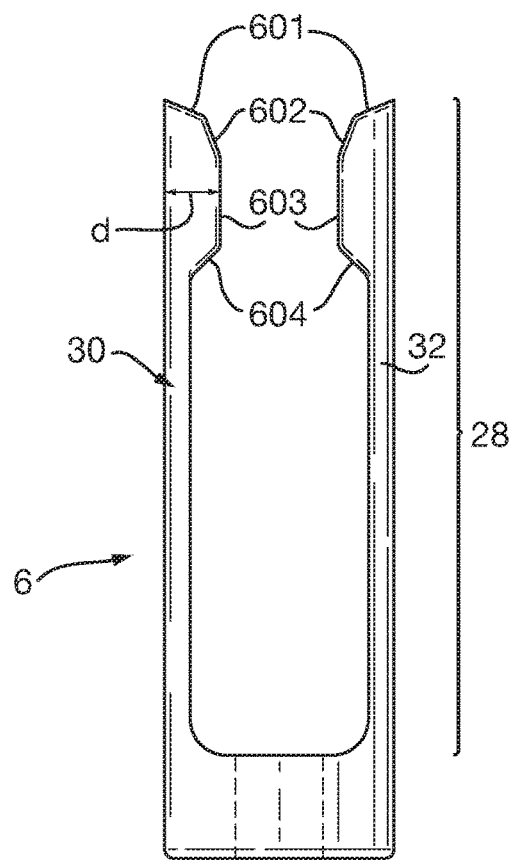
FIG. 6A is a cross sectional view of the second tubular member of FIG. 3.

FIG. 6A shows in more detail the ends 30a, 32a of the arms 30, 32 of the second tubular element 6. The end of each arm 30a, 32a comprises a work-piece engagement face 601, or clamping face, which contacts the work-piece when the fastener is in use and is clamping the work-pieces together. The clamping load is applied to the work-pieces via this face 601. The clamping face 601 is angled so that when the arms are splayed outwards in use, this face is parallel to the plane of the work-pieces, and therefore the clamping load is applied evenly across this face 601. The clamping face 601 can be polished to reduce marking of the work-pieces during use. It is advantageous for this face to be as large as possible to spread the clamping load to avoid marking the work-pieces. Each of the arm ends 30a, 32a also have a taper-engagement face 602, located further from the end of the arms than the clamping face 601, which engages with the taper 44 and the upper portion 40 of the screw member 8 when in use.

In an alternative embodiment (not shown), the screw member 8 may not have a tapered portion 44, but a step transition between the upper portion 40 and the mid portion 38. In this embodiment, the taper-engagement face 602 is angled so that the arms 30, 32 run smoothly over the step. In a further embodiment, where a taper 44 is provided as a transition between the upper portion 40 and mid-portion 38 of the screw member 8, the taper-engagement face 602 of the arm ends 30a, 32a may be omitted. However, the combination of a tapered portion 44 of the screw member 8 and a taper-engagement face 602 on the arm ends 30a, 32a is preferable.

Each of the arms also has an upper portion engagement face 603, for engaging with the upper portion 40 of the screw member 8. The upper portion engagement face 603 is provided further from the end of the arms 30, 32 than the taper engagement face 602. The upper portion engagement face 603 is parallel to the outer body of the second tubular member 6 and in use it guides the arms along the upper portion 40 of the screw member 8. When the arms 30, 32 are biased outwardly against the screw member 8, they exert a force on the upper portion 40 of the screw member; the length of the upper portion engagement face 603 is selected to spread the effect of this force and therefore reduce wear on the upper portion of the screw member 8. The distance, d, between the upper portion engagement face 603 and the outside of the arms 30, 32 defines the amount by which the legs spread when in use. The arms also have a recessed face 604 further from the end of the arms 30, 32 than the upper portion engagement face 603. The recessed face 604 is undercut and provides clearance so that the upper portion engagement face 603 can remain in contact with the upper portion 40 of the screw member 8 when in use.

Figure 6B:
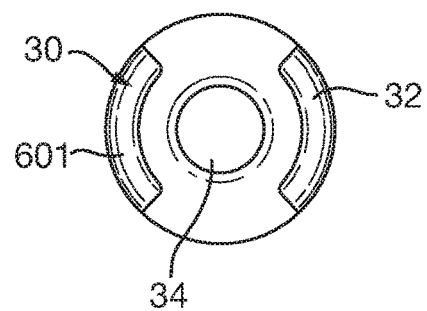
FIG. 6B is an end view of the second tubular member of FIG. 3 as viewed from the ends of the arms of the second tubular member.

FIG. 6B is an end view of the arms 30, 32 of the second tubular element 6. It can be seen that the arms have a curved cross section. This increases the strength of the arms and allows a greater clamping load to be applied to the work-pieces than a flat cross section.

The length of the arms 30, 32 of the second tubular element 6 are chosen in dependence on the material of construction, so that the arms are biased within their elastic limit. The arms 30, 32 can be thought of as sprung, where they can be biased outward by a force and then return to the same resting position when the force is removed. For a fastener of diameter 5 mm made of steel, the length of the arms 30, 32 of the second tubular element are around 20 mm and 0.5 mm thick.

When the removable blind fastener 2 is to be used for co-joining the two airframe components 10 and 12 (also called work pieces herein), the first and second tubular elements 4 and 6 and the elongate screw member 8 are assembled to form a single unit, see FIG. 1 with the respective arm portions 22 and 28 (shown in FIGS. 2 and 3 respectively) of the first and second tubular elements 4 and 6 arranged in mutual juxtaposition see FIG. 1. The arms 30, 32 of the arm portion 28 of the second tubular element 6 are arranged to occupy at least part of the space defined between the arms 24, 26 of the first tubular element 4, such that the arms of the first and second tubular elements can slidably inter-engage to define a generally cylindrical body for the fastener 2. The space between the arms of the first tubular element 24, 26 act as guides for the arms of the second tubular element 6 and the edges of the arms of the first tubular element 4 act as a guide surface, providing a reaction force against the twisting motion imparted by the turning of the screw member 8.

When the removable blind fastener 2 is assembled for use, the externally threaded portion 46 of the screw member 8 is passed through the head of the first tubular element 4 and received in the internally threaded tubular portion 34 of the screw member 8, see FIG. 1. The arms 30, 32 of the second tubular element 6 slide past the arms 24, 26 of the first tubular element 4 to an extent. When the screw member 8 is turned, the second tubular element 6 is drawn towards the first tubular element 4, the arms of each tubular element sliding past each other, while also providing a reaction force against each other to stop the second tubular member 6 rotating with the screw member 8. The second element 6 is prevented from being removed from the head end of the first element 4 because the arms 30, 32 of the second element 6 are stopped against the head end of the first element. The arms 24, 26 of the first element 4 may also be stopped against the internally threaded portion 36 of the second member 6. The fastener 2 is therefore inserted as a whole unit into an aperture, as opposed to inserting each component separately and assembling the fastener in situ.

The externally threaded portion 46 of the screw member 8 may be made long in relation to the arm lengths so that the threaded portion 34 of the second tubular element 6 engages with the threaded portion 46 of the screw member 8 before the arms of the first and second tubular element engage with each other. This has the advantage that, when the screw member 8 is turned to release the fastener 2 from the work-piece, the arms of the tubular elements 4, 6 slide past each other until they disengage, and further turning of the screw member 8 will simply cause the second tubular element 6 to rotate with the screw member 8, rather than dropping off the end of the screw member 8 where it may be difficult to retrieve.

In order to temporarily assemble the airframe components 10 and 12, the removable blind fastener 2 is inserted through aligned apertures provided in the components 10 and 12 as shown in FIG. 5A. In FIGS. 5A to 5D an embodiment of the fastener having a narrow second portion of the type shown in FIG. 7B. The fastener could also be waisted as shown in FIG. 4.

A tool, not shown, is then used to engage in the blind aperture 50 of the screw member 8 to rotate it in a clockwise direction thereby causing the second tubular element 6 to move upwardly with respect to the first tubular element 4. This action brings end portions 30a and 32a of the arms 30 and 32 respectively into engagement with the tapered portion 44 of the screw member 8 and causes the arms 30 and 32 to splay outwardly, as shown in FIG. 5B.

The arms 30, 32 are then splayed to their full extent in an outward direction when the ends of the arms 30a, 32a are engaged with the upper portion 40 of the screw member 8, as shown in FIG. 5C. Further rotation of the screw member 8 will cause movement of the arms 30, 32 in a direction parallel with the main axis of the fastener towards the work pieces, but no further movement in a direction perpendicular to the main axis of the fastener.

As the arms 30 and 32 continue to move towards the work piece they engage with an underside of the component 12 causing movement of the component 12 towards the component 10 of the airframe thereby co-joining the components 10 and 12 together as shown in FIG. 5D.

It can be seen that there are three phases to the action of the fastener during tightening. These phases are described below with reference to the main axis of the fastener, which is defined as the axis running along the centre of the screw member as shown as AA' in FIG. 1. The first phase is where, as the screw member 8 is rotated in a clockwise direction, the second tubular element 6 is moving toward the first tubular element 4 with the arms 30, 32 recessed to be flush with the outer surface of the fastener, i.e. the outer surface of the first tubular element 4. The second phase begins as the ends 30a, 32a of the arms 30, 32 begin to engage with the tapered portion 44 of the screw member 8 and begin to splay away from, that is, in a direction perpendicular to, the main axis of the fastener, while the arms continue to move in a direction parallel to the main axis of the fastener. The second phase continues until the ends 30a, 32a reach the end of the taper 44 of the screw member 8. The third phase occurs as the ends 30a, 32a of the arms 30,32 move over the smooth upper part of the screw member 8, the third phase characterised in that now the arms are only moving in a direction parallel to the main axis of the fastener. It is preferable that the ends 30a, 32a of the arms 30, 32 do not contact the underside of the component 12 until the fastener is in the third phase, when the arms are no longer moving in a direction perpendicular to the main axis of the fastener, so that the arms do not scrape the component or bite into it as they clamp onto it. Optimally the clamping action occurs in the third phase so that the full clamping load is applied in a direction parallel to the main axis of the fastener.

The arms are able to move in a direction only parallel to the main axis of the fastener by virtue of the recessed face 604, the undercut of which provides clearance between the ends and the taper during the third phase.

In order to prevent the removable blind fastener 2 from rotating when the tool is in use, the tool also comprises means, not shown, that engage with the radial slots 20 to prevent rotation of the removable blind fastener when the elongate screw member 8 is rotated as described herein.

When it is desired to remove the fastener 2 from the co-joined components 10 and 12, the tool, not shown, is used to rotate the screw member 8 in an anticlockwise direction thereby causing the second tubular element 6 to move downwardly with respect to the first tubular element 4 whereby the end portions 30a and 32a of the arms 30 and 32 respectively are moved to an inoperative condition in mutual alignment with the tubular element 4 thereby enabling the removable blind fastener 2 to be removed from the aligned apertures 10a and 12a.

The fastener is suitable for use in narrow apertures because the arms of the first member and the second member interlock and therefore present a slender profile when in the retracted position. Typical dimensions of aperture in which the fastener 2 can be used range from 3 mm to 6 mm, although other dimensions are of course possible, for example 10 mm to 20 mm apertures. For larger apertures the bifurcated portions of the first and second member may be substituted for three, four or more arms to ensure an even clamping load on the underside of the work-piece 126.

The fastener is 2 is particularly suited to temporarily joining components through narrow apertures because the end of the arms 30a, 32a are recessed within the body of the fastener, and the narrow part of the screw member accommodates this within the body of the fastener.

The first and second tubular elements 4 and 6 and the elongate screw member 8 may be made from any suitable metal such a steel or, alternatively these parts may be made from carbon fibre reinforced plastic compositions. Alternatively, the parts of the fastener may be fabricated from different materials, for example the first and second tubular elements made from plastic components while the screw member is made from steel.

FIG. 7A shows a fastener where both a first element 701 and second element 702 have three arms.

Figure 7B:
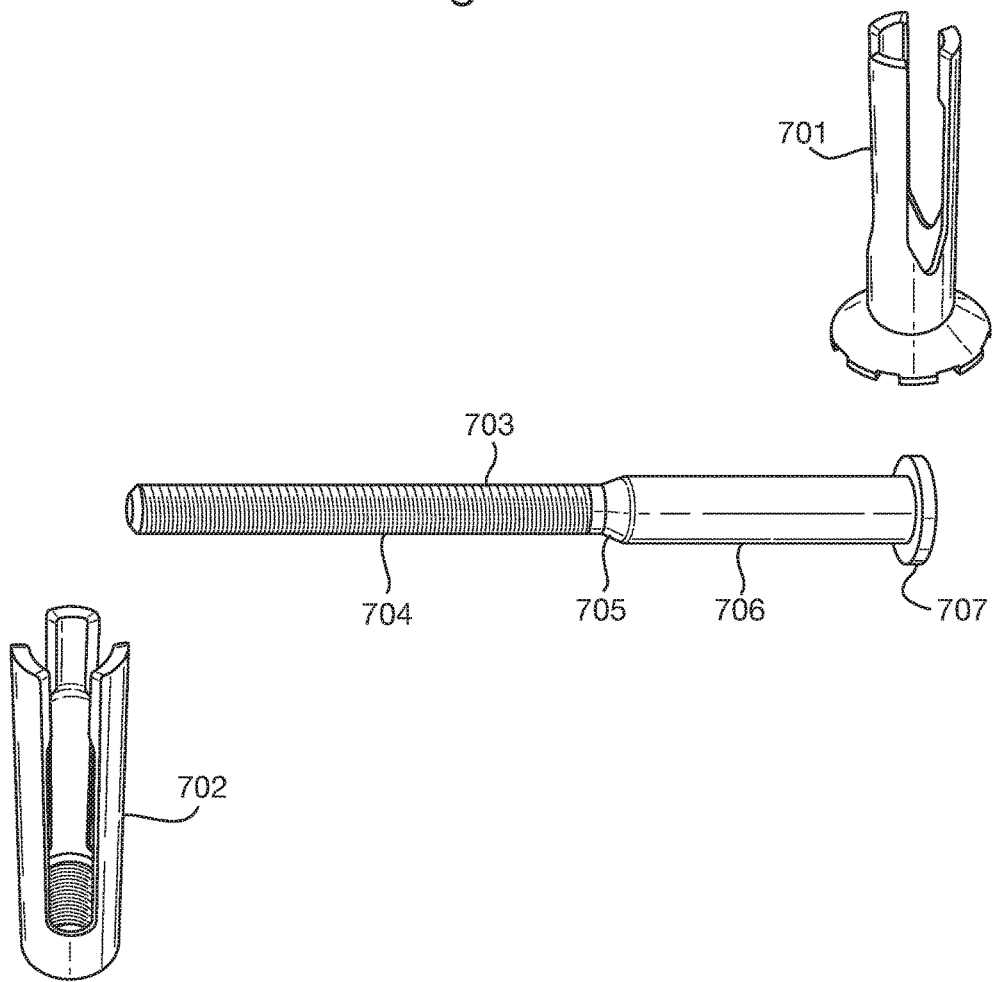
FIG. 7B is a perspective view of the components of the fastener shown in FIG. 7A.

FIG. 7B shows the parts of the screw member of FIG. 7A. Screw member 703 has a lower part 704 which is threaded, a tapered portion 705, an upper portion 706 and a flanged head portion 707. The threaded portion 704 of the screw member 703 is narrow, and unlike the embodiment shown in FIG. 4, is the same diameter as the narrower end of the taper 705. The screw member 703 has two significant portions, a first portion, which is the upper portion 706 and is smooth, and a second portion which is the lower portion 704 and is threaded. The first portion has a larger diameter than the second portion and the transition between the first portion and the second portion creates a feature that actuates the arms 702a of the second tubular element 702 and causes them to splay outward as the screw member 703 is rotated. The second tubular element 702 may travel all the way along the screw member 703 in use and drop off the end.

The screw member 8 shown in FIG. 4 has a third region, defined as the lower portion 42 below a mid portion 38 (mid portion 38 in this embodiment is equivalent to the second portion of the screw member 703 shown in FIG. 7B, although the mid portion does not need to be threaded). In this embodiment, the third portion 42 has a greater diameter than the mid portion 38 of the threaded part of the screw member, so that the mid-portion is a narrow waist. The clamping load that can be applied to a thread is proportional to the diameter of the threaded portion. Therefore providing a third region with an increased diameter allows a greater clamping load to be applied to the components when compared to a fastener with a thread provided on a narrow second region, such as shown in FIG. 7B.

FIG. 7C shows the three-armed fastener in a condition where the arms 702a of the second tubular element 702 are disengaged from the arms 701 a of the first tubular element 701 so that rotation of the screw member 703 cannot cause the second tubular element 702 to move along the screw member 703 any further, but rotate with it instead; this prevents the second tubular element 702 from dropping off the end of the screw member 703. FIG. 7D shows a three-armed fastener provided with a stop nut 705 on the end of the screw member 703. The nut 705 can be fixed to the thread of the screw member to stop the arms 702a of the second tubular element 702 from disengaging with the arms 701 a of the first tubular element 701; rotation of the screw member 703 will be prevented when the second tubular element 702 reaches the nut 705, but the first and second tubular elements cannot disengage from each other.

Figure 8:
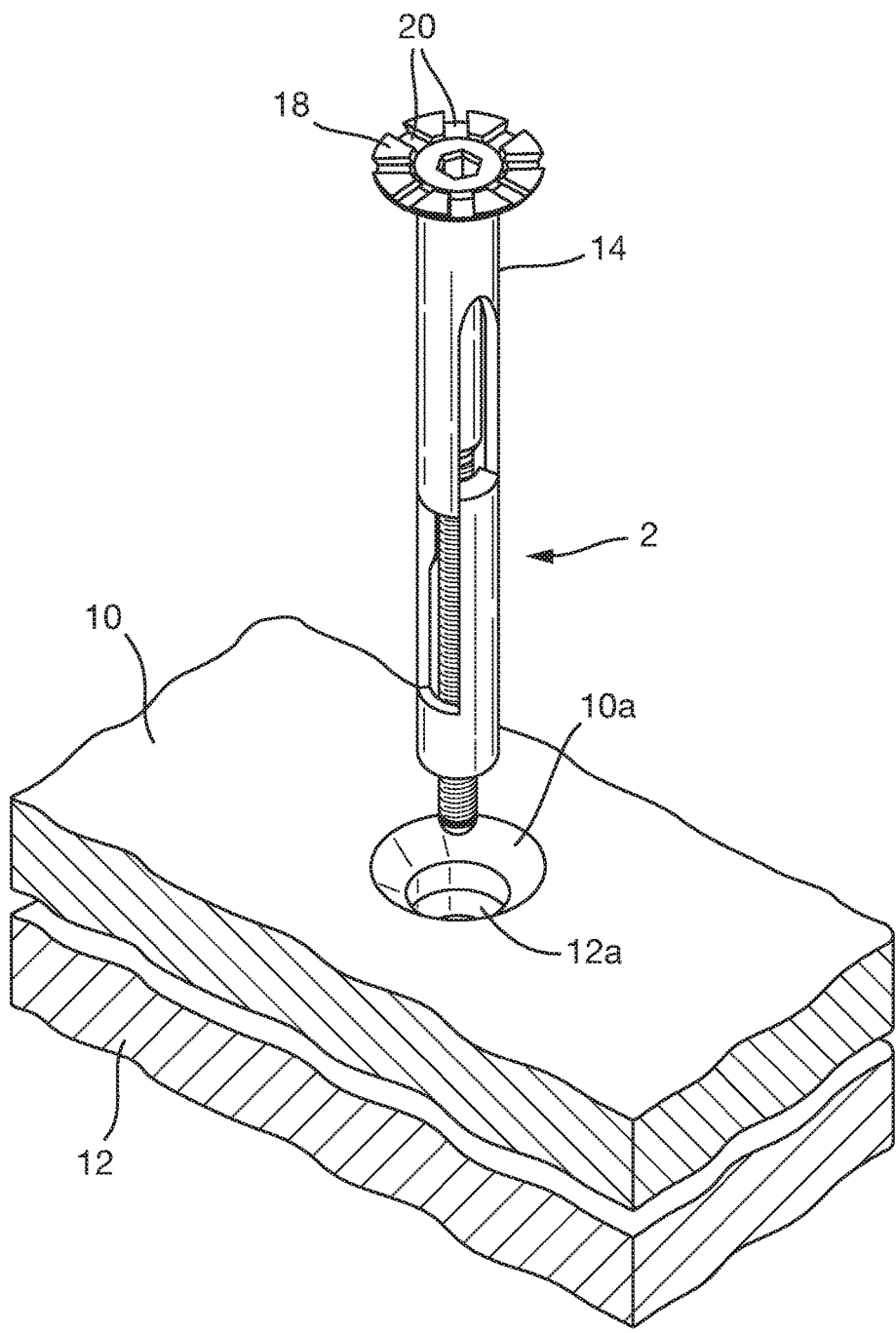
FIG. 8 is a further embodiment of the fastener having an extended upper portion for clamping thick components.

To clamp thicker components, the upper portion of the first tubular element can be extended, as shown in FIG. 8.

Figure 9:
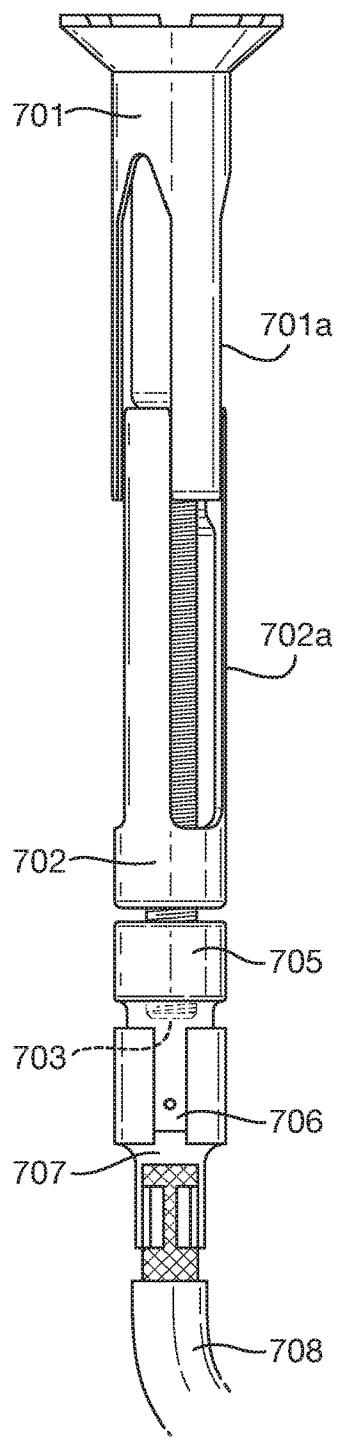
FIG. 9 is a further embodiment of the fastener having an electrical connection provided to conduct electricity.

The fastener can be an effective conductor of electricity between the outside and the inside of a structure. For example, if the fastener is used to fix electrically insulating components together, such as the composite materials of an aircraft structure, then the fastener can become an effective lightning conductor. Electrical charge can be dissipated from the fastener to a suitable point in the aircraft. The fastener can be provided with an electrical connection as shown in FIG. 9. The stop nut 705 on the screw member 703 is provided with, for example, a male blade connector 706. An electrical cable 708 can then be attached to the fastener by means of a female blade connector 707 attached to the male blade connector 706. Any other known means of attaching an electrical cable to the fastener may be used. The connectors may rotate with the nut or an arrangement may be provided to prevent the connectors from rotating with the nut, for example a bushed connection. Alternatively the electrical cable may be fixed to the centre of the screw member 8. Furthermore, the first tubular element 701 and the second tubular element 702 may both be fabricated from an insulating material, while the screw member 703 is made of an electrical conductor and this will also provide a conductive path through insulating components.

Figure 10:
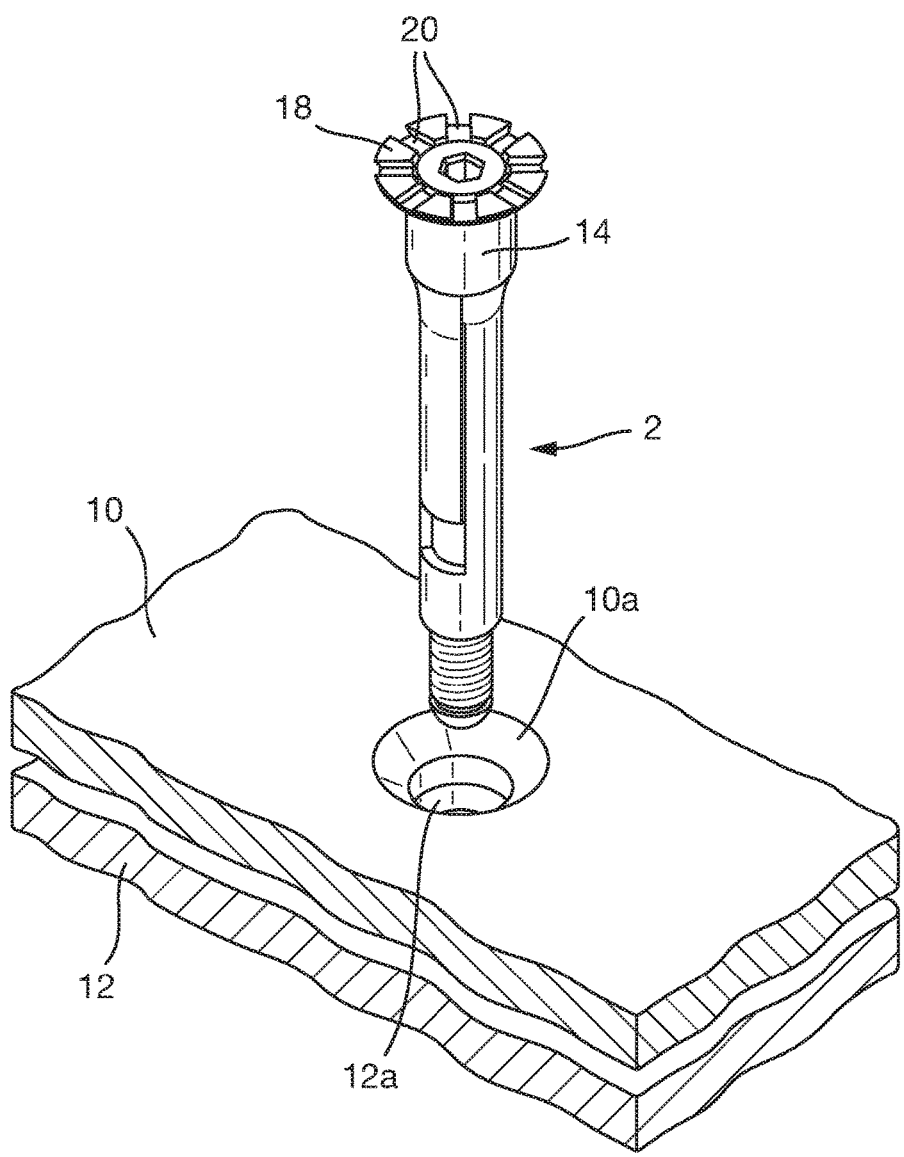
FIG. 10 is a further embodiment of the fastener having shorter guide channels.

FIG. 10 shows a further embodiment of a fastener where the guide channels of the first tubular element are shortened.

It will be appreciated that the appended claims may extend to configurations of the removable blind fastener 2 that have not been described herein in detail.

Whereas the removable blind fastener 2 has been described herein for use in co-joining the component parts of an airframe, it will be understood that the fastener 2 may be used for temporarily co-joining any components with or without additional elements that may be interposed between such components.

The invention claimed is:

1. A removable blind fastener comprising:
   a) a first tubular element of elongate form with a head portion at one end and an arm portion having a plurality of arms extending away from the head end of the first tubular element in a direction parallel to a central axis of the first tubular element, a space between said arms forming guide channels;

b) a second tubular element of elongate form comprising an internally threaded portion and an arm portion having a plurality of outwardly biasable resilient arms extending away from the threaded portion in a direction parallel to a central axis of the second tubular element, each of said arms having an end portion at a free end thereof, said arms of the second tubular element arranged to move within the guide channels of the first tubular element; and, c) an elongate screw member comprising a screw head located, in use, within the head portion of the first element and wherein the second element is prevented from being removed from the head end of the first element by the head portion of the first element whereby:

(i) rotation of the screw member in a first direction causes telescoping movement of the second tubular element away from the head portion of the first member in a releasing direction; and, (ii) rotation of the screw member in a second direction causes telescoping movement of the second tubular element towards the head portion of the first tubular member in a clamping direction, such that when the removable blind fastener is in use the arms of the second tubular element are located in mutual juxtaposition with the guide channels of the first tubular element, such that space between the arms of the first tubular element is occupiable by the arms of the second tubular element and space between the arms of the second tubular element is occupiable by the arms of the first tubular element, wherein the screw member comprises a first portion near the head end of the screw member and a second portion further from the head end of the screw member than the first portion, wherein a diameter of the first portion is greater than a diameter of the second portion, such that a transition between the first portion and the second portion provides an arm actuating feature, and when in use and the elongate screw member is rotated in the second direction as aforesaid, the end portions of the arm portion of the second tubular element are moved towards the head portion of the first tubular element within the guide channels of the first tubular element as aforesaid, and the end portions of the arm portion are brought into engagement with the arm actuating feature of the screw member to bias the end portions of the second tubular element outward, away from the central axis of the second tubular element, and wherein, in use, the fastener comprising a unit of the first tubular element, second tubular element and screw member is insertable and removable through an aperture in each of two work-pieces to be joined together.

2. A removable blind fastener according to claim 1, wherein the screw member comprises a third portion further from the head end of the screw member than the second portion, said third portion having a diameter greater than that of the second portion, such that the second portion of the screw member defines a narrow waist to the screw member and wherein the third portion is threaded for engaging with the internally threaded portion of the second tubular element.

3. A removable blind fastener according to claim 1, wherein the elongate screw member comprises a tapered portion between the first portion and the second portion thereof, the tapered portion providing the transition between the first and second portions.

4. A removable blind fastener according to claim 1, wherein the end portions of the arm portions of the second tubular element have a thickness in a direction perpendicular to the central axis of the second tubular element, wherein the thickness of the end determines the distance that end portions are biased away from the central axis of the second tubular element.

5. A removable blind fastener according to claim 1, wherein the ends of the second tubular element have a clamping face arranged at an angle such that, when the arms are biased outward the clamping face is substantially perpendicular to the central axis of the second tubular element.

6. A removable blind fastener according to claim 1, wherein the arms of the second tubular element have an arcuate cross section.

7. A removable blind fastener according to claim 1, wherein the number of arms of the second tubular element is equal to the number of guide channels of the first tubular element.

8. A removable blind fastener according to claim 1, wherein the first and second tubular elements have two or three or four arms.

9. A removable blind fastener according to claim 8, wherein an end face of the outwardly flared portion comprises a plurality of equally spaced radial slots.

10. A removable blind fastener according to claim 1, wherein, when assembled for use, the fastener has a constant external diameter along its length except for the head portion of the first tubular element, the head portion of which comprises an outwardly flared portion.

11. A removable blind fastener according to claim 10, wherein, when the fastener is in use for temporarily co-joining elements of a component, engagement of the tool element with the spaced radial slots of the first tubular element prevents rotation of the fastener when the elongate screw member is rotated in either its first or second directions.

12. A removable blind fastener according to claim 1, wherein the screw head of the elongate screw member comprises a blind aperture to facilitate by use of a tool, when the fastener is in use, rotation of the screw in either a first or a second direction.

13. A removable blind fastener according to claim 1, wherein the first and second tubular elements and the elongate screw member are made from steel.

14. A removable blind fastener according to claim 1, wherein the first and second tubular elements and the elongated screw member are made from carbon fiber reinforced plastic compositions.

15. A removable blind fastener according to claim 1, wherein the arm portions of the first and second tubular elements are bifurcated.

16. A removable blind fastener according to claim 1, wherein an electrical connection is provided for conducting electricity away from the fastener.

* * * * *